March 10, 1964     J. C. M. FROST     3,124,323
AIRCRAFT PROPULSION AND CONTROL
Filed March 7, 1963     6 Sheets-Sheet 1
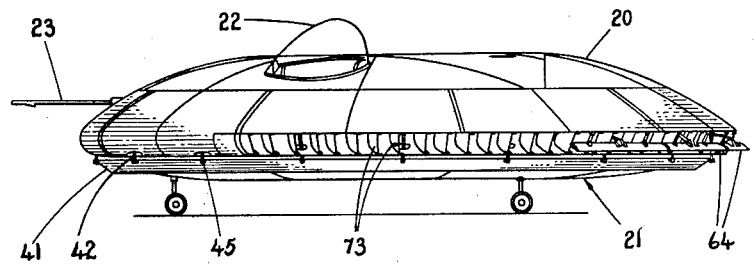
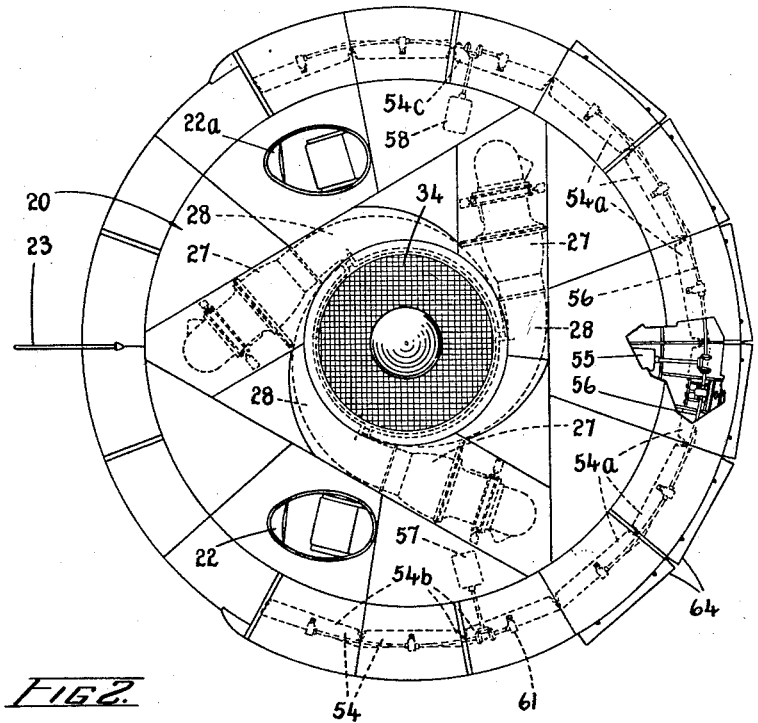
INVENTOR
J. C. M. FROST
BY
Maybee & Legris
ATTORNEYS

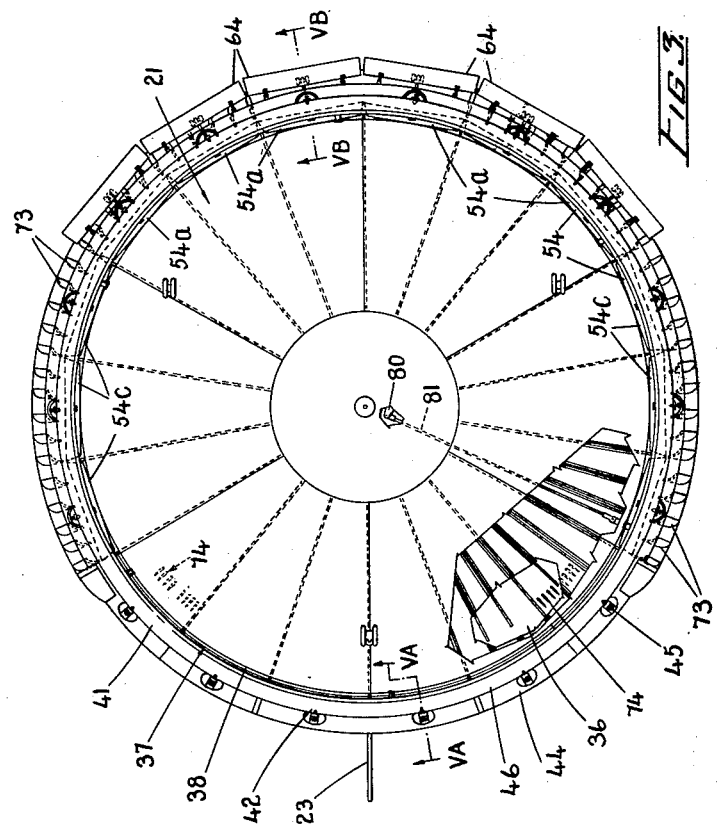

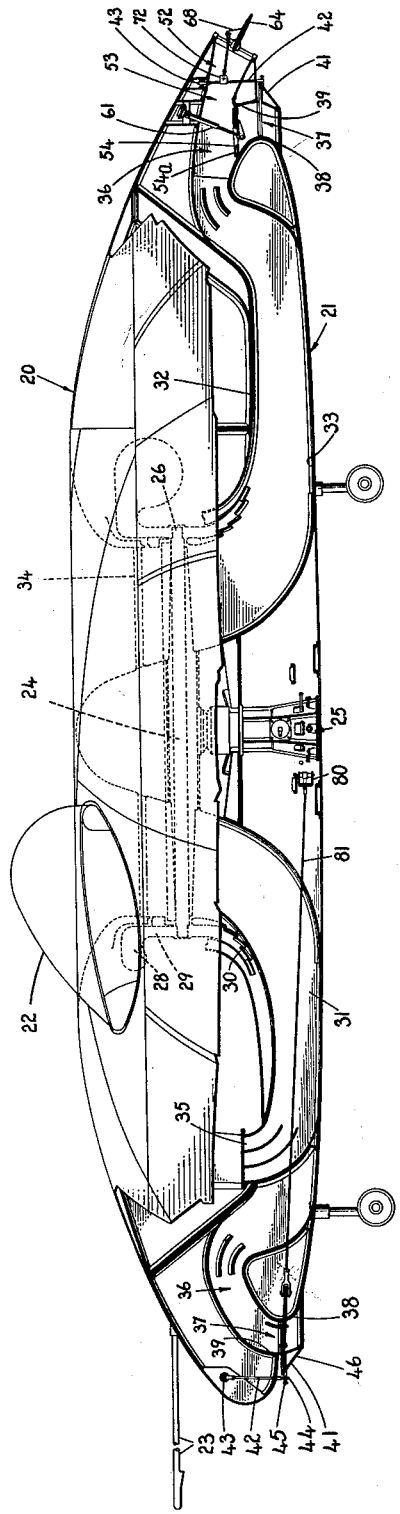

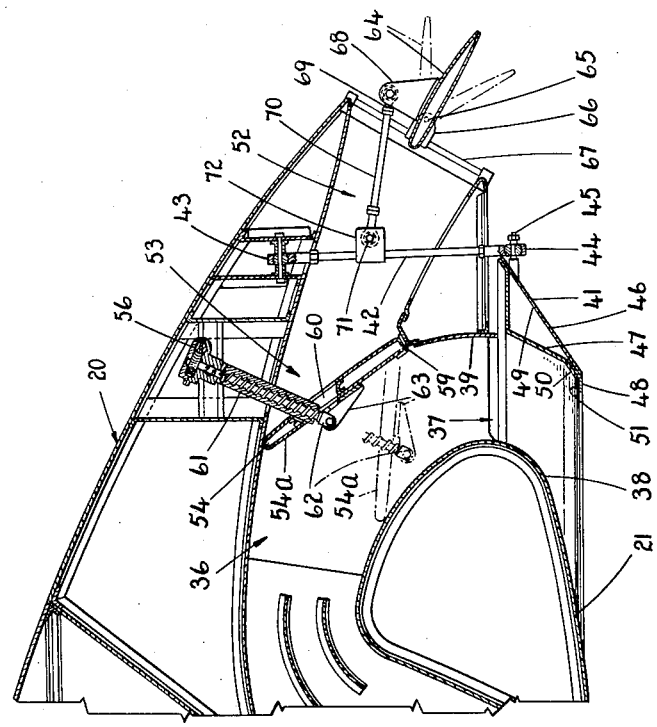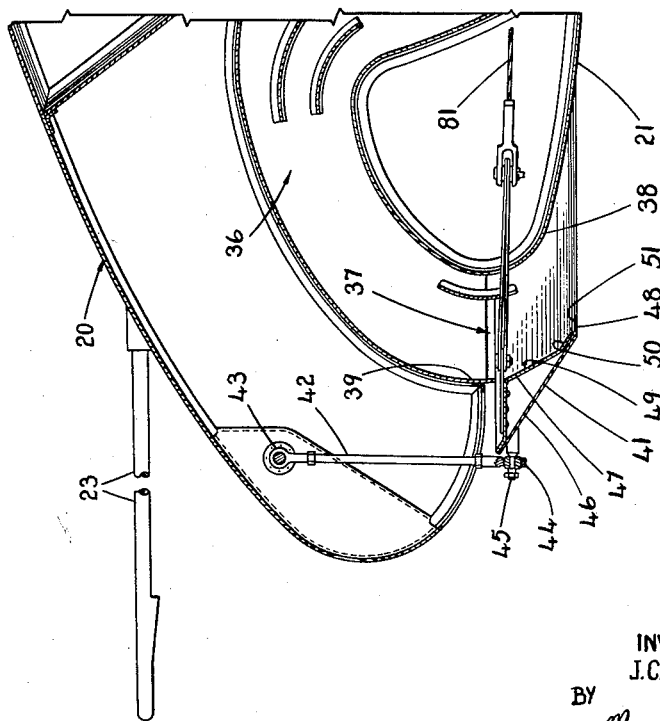

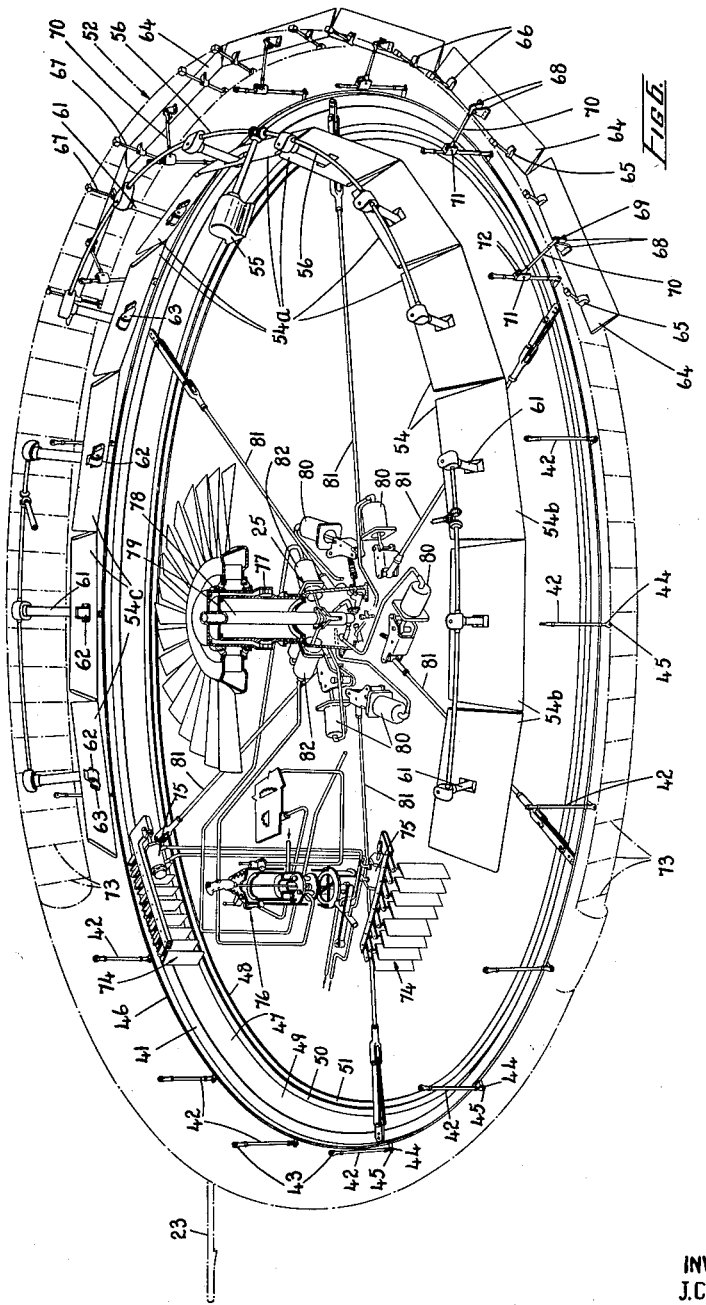

March 10, 1964     J. C. M. FROST     3,124,323
AIRCRAFT PROPULSION AND CONTROL

Filed March 7, 1963                                     6 Sheets—Sheet 6

INVENTOR
J.C.M.FROST
BY
*Maybee & Legris*
ATTORNEYS

United States Patent Office 3,124,323
Patented Mar. 10, 1964

3,124,323
AIRCRAFT PROPULSION AND CONTROL
John C. M. Frost, Epsom, Auckland, New Zealand, assignor to Hawker Siddeley Canada Ltd., Malton Village, Ontario, Canada, a corporation
Filed Mar. 7, 1963, Ser. No. 263,532
26 Claims. (Cl. 244—12)

This invention relates to aircraft and more particularly to an aircraft having a body structure and a downwardly directed propulsive nozzle having a mouth arranged to discharge at a multiplicity of positions distributed around a periphery on the underside of the structure and a further propulsive nozzle extending around a rear portion of the periphery of the structure. The aircraft derives propulsive thrust from the ejection of propulsive gas at high velocity through one or both of the propulsive nozzles.

The co-pending application Serial No. 108,365 dated May 8, 1961, of John Carver Meadows Frost discloses a circular aircraft having a lentiform body structure sheathed by opposed aerofoil surfaces which provide lift developing surfaces for the aircraft. That aircraft has a gas displacement passage which is arranged to terminate in a propulsive nozzle having a mouth in the underside of the aircraft. Gas directing means is suspended adjacent to a boundary of the mouth of the nozzle and has a gas control surface shaped to direct gas expelled from the mouth inboardly around a convex surface. The gas control surface forms a movable extension of the outboard boundary of the mouth of the nozzle and actuating means is provided to move the gas directing means on its suspension means to vary the position of the gas control surface relative to said mouth and to variably control the direction of flow of propulsive gas expelled from the mouth. Appropriate movement of the gas directing means enables the aircraft to hover or move in forward flight and to accomplish the transition between hovering and forward flight.

The aircraft described in said co-pending application has engine means for impelling gas along the gas displacement passage which includes an impelling rotor which is universally mounted in the structure and is biased to a neutral position relative to the structure. The rotor is operatively connected to the gas directing means whereby tilting of the rotor from its neutral position operates the gas directing means to stabilize the aircraft. This is accomplished automatically and, in addition, pilot operated means are provided to apply a tilting force to the rotor whereby the gas directing means may be moved in a desired direction to impose a control force on the aircraft.

The aircraft of the present invention is a development of the aircraft described and claimed in the previously mentioned application Serial No. 108,365. The present aircraft differs from that described in said application primarily in the propulsion and control arrangements provided for forward flight and for the transition between forward flight and hovering. Thus there is provided, in addition to a downwardly directed propulsive nozzle controlled by gas directing means as in the previous application, a generally rearwardly directed peripheral nozzle for forward flight. Variable flow-proportioning means are provided for splitting the flow in a desired manner between the two nozzles to effect transition from hovering to forward flight. Moreover, in the preferred form of the invention, elevator vanes hinged about substantially horizontal axes are provided in the gas flow ejected from the central portion of the peripheral nozzle and operate as jet flaps. These vanes are inter-connected with the gas directing means and move therewith so that there is no hiatus of control while the transition from hovering to forward flight and vice-versa is taking place.

The invention will now be described by way of example with reference to the accompanying drawings, in which like reference characters indicate similar parts throughout the several views, and in which:

FIGURE 1 is a side elevation of an aircraft embodying the invention;

FIGURE 2 is a plan view of the aircraft of FIGURE 1 showing the location of the engines and the flow-proportioning means in phantom lines and being partly broken away to show the actuating means for the flow-proportioning means;

FIGURE 3 is an under-plan view of the aircraft of FIGURES 1 and 2 partly broken away to show the actuating cables of the gas directing means and the location of the rudder blades;

FIGURE 4 is a side elevation of the aircraft on a larger scale partly broken away to show the gas directing means, the actuating means, the flow-proportioning means and the elevator vanes for forward flight;

FIGURES 5A and 5B are sections of the outboard portions of the aircraft taken on the lines VA—VA and VB—VB, respectively, of FIGURE 3 and showing the gas directing means, the flow proportioning means and the elevator vanes in detail;

FIGURE 6 is a diagrammatic perspective view of the control system of the aircraft.

Figure 7:
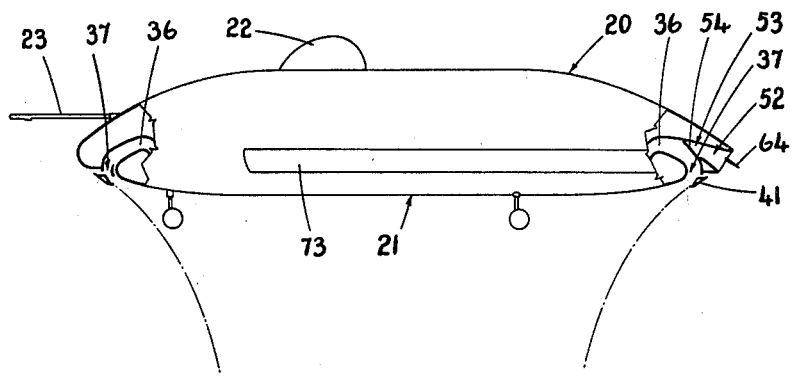
FIGURES 7 and 8 are diagrams showing the gas flow from the aircraft while the latter is hovering and in forward flight, respectively.
Figure 8:
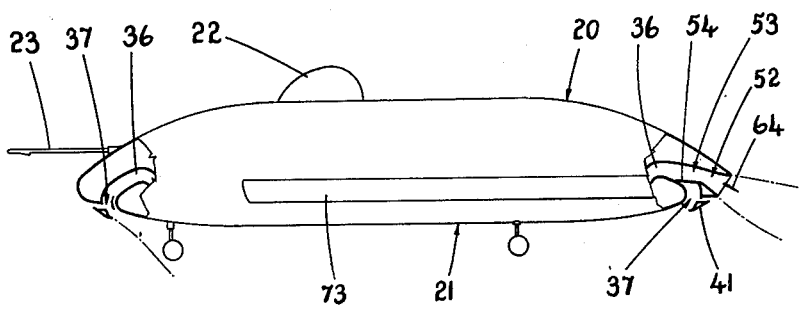

Referring now to FIGURES 1 to 4, the aircraft comprises a lentiform body structure which is sheathed by upper and lower aerofoil skins which provide lift surfaces for the aircraft. The skin providing the upper aerofoil surface is indicated at 20 and the skin providing the lower aerofoil surface is indicated at 21. The upper skin is divided into various removable panels as shown in FIGURE 2 to facilitate access to the inside of the body structure. The aircraft has two cockpits, 22 and 22a for the pilot and for the observer, respectively. A pitot head is located at the forward end of a boom 23 projecting from the front of the aircraft. As shown most clearly in FIGURE 4, the aircraft includes an impelling rotor 24 mounted substantially centrally within the aircraft for universal movement on a base indicated generally at 25. The rotor 24 has turbine blades 26 at its periphery and is rotated by means of gas turbine engines 27 which discharge propulsive gas through "tusk" manifolds 28 into a ring manifold 29. The propulsive gas from the gas turbine engines passes from the turbine blades 26 through exhaust boxes 30 into a first gas displacement passage 31 defined between upper and lower walls 32 and 33 respectively in the body structure. The lower wall 33 is formed by the upper surface of the lower aerofoil skin 21. The impelling rotor 24 draws air through a grating 34 and delivers the air into the first gas displacement passage 31. The body structure of the aircraft is made up of radially disposed ribs so that the gas displacement passage comprises a number of segment-shaped elements. Three of these elements stop short of the periphery of the structure and provide air inlets for the engines 27; one of these air inlets is indicated at 35 in FIGURE 4.

For a more detailed description of the skeletal structure of the aircraft, the impelling rotor, the first gas displacement passage and the arrangement of the gas turbine engines, reference should be made to the structure described in application Serial No. 832,404 dated August 6, 1959, of John Carver Meadows Frost and Claude John Williams since in each respect the structure of the present aircraft is similar thereto.

Throughout the description and in the claims, certain terms of positional relationship are used for convenience. The terms "outboard" (or "outboardly") and "inboard" (or "inboardly") denote, respectively, greater and lesser distances from the spin axes of the rotor or the approximate centre of the downwardly directed propulsive nozzle when the latter is viewed in plan. The terms "vertical," "upwardly" and "downwardly" denote directions approximately substantially normal to the medial, or chord, plane between the upper and lower aerofoil surfaces of the body sheath.

The first gas displacement passage 31 extends outboardly from the impelling rotor 24 to a substantially annular chamber 36 and then generally downwardly to terminate in a propulsive nozzle having an annular mouth 37 in the underside of the structure.

The lower wall 33 forms the inboard boundary of the mouth as indicated at 38 and merges with the lower aerofoil skin 21 in a smooth, outboardly convex surface. The upper wall 32 forms the outboard boundary of the mouth 37 as indicated at 39.

Gas directing means in the form of a gas control ring 41 is suspended adjacent to, and beneath, the outboard boundary 39 of the nozzle; the arrangement is best shown in FIGURES 3, 4 and 5. The ring 41 extends around the entire periphery of the annular propulsive nozzle 37 and is supported by eighteen links 42 spaced circumferentially around the body structure. Each link 42 is substantially vertical when the ring 41 is in its central position and is universally mounted at its upper end 43 to the body structure and is secured at its lower end 44 with limited universal movement to a pin 45 projecting from the outboard surface of the ring. The links pass through apertures in the body structure and suspend the ring 41 for movement relative to the mouth 37 of the nozzle.

The ring 41 is formed of three parts, an outer part 46, an inner part 47 shaped so as to enclose, with the part 46, a triangular space as shown in FIGURE 5, and a lower part 48 interposed between the lower ends of the outer and inner parts. This box-section construction gives rigidity to the ring and the triangular space may be filled with a foamed plastic material to reinforce the ring. The inboard surfaces of the parts 47 and 48 provide a gas control surface which may be considered to be in three parts; an upper part 49 which is directed slightly inboardly, an intermediate part 50 which is directed more steeply inboardly and a lower part 51 which is horizontal and inboardly directed. The parts 49, 50 and 51 together constitute a gas control surface which directs propulsive gas leaving the mouth 37 generally inboardly towards the center of the aircraft.

The gas control surface constituted by the parts 49, 50 and 51 itself constitutes a movable extension of the outboard boundary 39 of the mouth 37 of the propulsive nozzle and, as the ring 41 moves on its suspension links 42, the portion of the gas control surface relative to the mouth will vary and will thereby control the direction of flow of the propulsive gas expelled from the mouth 37 of the nozzle.

Around the rear 120° of the aircraft there is provided a further propulsive nozzle which discharges around the rear part of the periphery of the aircraft. This peripheral nozzle is indicated generally at 52 and is fed with propulsive gas from a second gas displacement passage 53 which leads off the first gas displacement passage 31 at the annular chamber 36. As will be appreciated, the junction between the first and second gas displacement passages in the annular chamber 36 is arcuate, and mounted at the junction is flow-proportioning means to apportion between the passages the flow of propulsive gas. The flow-proportioning means takes the form of three series of flaps 54. The arcuate arrangement of the flaps 54 is clearly shown in FIGURES 2 and 6. The central series consists of six flaps indicated at 54a. One lateral series of three flaps is indicated at 54b and the three flaps of the other lateral series are indicated at 54c. The flaps of each series are connected to move together but each series of flaps is movable independently of each of the other series of flaps. Thus the flaps 54a are moved by an electric screw-jack actuator 55 and are interconnected by conventional flexible drives indicated at 56. Similarly, the flaps 54b are moved by an actuator 57 shown in FIGURE 2 and the flaps 54c by an actuator 58 also shown in FIGURE 2. The flaps 54b are connected together by flexible drives as are the flaps 54c.

Each flap 54 is hinged at its outboard edge as indicated at 59 in FIGURE 5 and is generally aerofoil in cross-section. Each flap is slotted at 60 to give passage to a screw jack 61, the lower end 62 of which is pivotally secured to a bracket 63 on the lower side of the flap. The upper ends of the screw jacks 61 are interconnected by the flexible drives 56 referred to heretofore and are driven in unison by the various actuators 55, 57 and 58 so that the flaps in each series move in unison as controlled by their respective actuators. Each flap 54 is movable between the full line and phantom line positions shown in FIGURE 5B. In the full line position all the propulsive gas flowing along the first gas displacement passage will be caused to pass through the downwardly directed annular nozzle 37 whereas, when the flaps are in their phantom line positions, all the gas passing along those segments of the first gas displacement passage 31 which are joined by the second gas displacement passage 53 will flow through the peripheral nozzle 52. It is apparent that various combinations of gas flow may be obtained by suitable variations of the settings of the various series of flaps 54a, 54b, and 54c.

Mounted outboardly of the central portion of the peripheral nozzle 52 are six elevator vanes 64; the vanes are arranged arcuately and extend over an arc of 120°. Each vane 64 corresponds in position and arcuate extension to one of the flaps 54a, and is pivoted about a substantially horizontal axis lying in the path of gas flow from the peripheral nozzle 52 and more or less centrally of the vertical extension of said nozzle. Each vane 64 is mounted on two spaced-apart pivot pins 65 which are supported by lugs 66 which in turn are supported by rods 67 spanning the mouth of the peripheral nozzle 52. The arrangement wherein two rods support each vane 64 is clearly shown in FIGURE 6.

Means are provided to interconnect the vanes 64 with the gas control ring 41. Thus, centrally of each vane is a pair of upstanding lugs 68 between which is pivotally mounted the outboard end 69 of a coupling rod 70. The inboard end of each coupling rod 70 is pivotally connected at 71 between a pair of lugs 72 secured to one of the suspension links 42 for the gas control ring. The interconnection between the vanes 64 and the gas control ring 41 is such that, when a point on the gas control ring which is adjacent to one of the flaps 64 moves inboardly, the outboard edge of the vane 64 will be elevated whereas, when the point on the gas control ring moves outboardly, the outboard edge of the vane 64 will be depressed. As will be explained hereinafter, this arrangement ensures that there is no loss of control during the transition from hovering, when the flaps 54 are in their full line positions, and forward flight, when the flaps 54 are in their phantom line positions.

Arranged outboardly of the major lateral portions of the peripheral nozzle 54 are fixed cascade vanes 73 which are shown in FIGURES 1 and 3. The vanes 73 occupy all but the central 40° of the arc subtended by the peripheral nozzle 52 at the rotor axis and serve to direct propulsive gas expelled from said nozzle generally rearwardly.

Mounted forwardly of the forward ends of the peripheral nozzle 54 are two sets of movable rudder blades indicated at 74. Each set of blades is operated by a pneumatic cylinder 75 which in turn is controlled from the pilot's control column assembly 76. Details of these rudder blades and their operation by the control column are described fully in the aforementioned application Serial No. 832,404.

Movement of the gas control ring 41 is effected from the rotor 24 in a manner identical to that described in the aforementioned application Serial No. 108,365, and reference should be made to that application for a detailed description of such operation. Briefly, referring to FIGURE 6, the rotor 24 is mounted on spherical bearings 77 and is connected to a control shaft 78. Tilting of the rotor 24 on the bearings pivots the control shaft 78 about a fulcrum provided by a diaphragm 79 so that the lower end of the shaft 78 is moved laterally. This movement of the shaft 78 is sensed by a pneumatic system which operates pneumatic actuators 80, which are connected to the gas directing ring by links 81. If the aircraft is tilted, the rotor tilts with reference to the body structure thus leaving the neutral position to which it is biased so moving the lower end of the shaft 78 to operate the actuators 80 thus causing movement of the gas control ring 41 to stabilize the aircraft as fully described in said application Serial No. 108,365. In order for the pilot to be able to control the aircraft, the shaft 78 may be tilted by means of actuators 82 controlled from the pilot's control column as fully described in said application Serial No. 108,365.

The operation of the aircraft will now be described so far as it differs from the operation of the aircraft described in the previous application Serial No. 108,365. The operation of both aircraft during hovering is identical. In this state, the gas control ring 41 is held in the central position as shown in FIGURE 5. The flow-proportioning flaps 54 are held in their upper positions as shown in full lines in FIGURE 5B and all the propulsive gas passing along the first gas displacement passage passes through the downwardly directed annular nozzle. The resultant gas flow is as shown diagrammatically in FIGURE 7 and the aircraft is supported upon a hollow column of gas. If, while the aircraft is hovering, it is hit by a gust of wind, the aircraft is stabilized by movement of the gas directing ring by the rotor as fully described in said previous application Serial No. 108,365.

In the aircraft described in application Serial No. 108,365, forward flight was obtained by moving the gas control ring rearwardly so that the aircraft tilted slightly nose downward and the column of gas discharged from the annular nozzle was angled backwardly so that the column both partially supported the aircraft and gave it a forward thrust. In the present invention, the transition to forward flight is effected by opening the flaps 54 so that the propulsive gas which is being passed down the first gas displacement passage is diverted over a substantial proportion of the periphery of the aircraft into the peripheral nozzle 52. The propulsive gas issuing from lateral portions of the peripheral nozzle 52 is rearwardly directed by the fixed cascade vanes 73.

Control of the aircraft in forward flight is obtained by means of the elevator vanes 64 which act as jet flaps. These vanes are able to control the aircraft in pitch and roll due to their distribution around 120° of arc at the rear of the aircraft. The control of the vanes 64 is effected by movement of the control shaft 78 of the rotor either automatically to stabilize the aircraft or by operation by the pilot of his controls. The movement of the vanes 64 depends upon the position of the gas control ring 41, and the interconnection between the vanes and the gas control ring by means of the rods 70 is such that, with gas flowing through both nozzles, the forces exerted on the aircraft due to movements of the vanes and the gas control ring would both be in the same sense. Let us assume, for example, that the rear portion of the gas control ring is moved inboardly. This would have the effect, if all the gas is passing through the annular nozzle, of decreasing the flow at the rear of the aircraft and increasing the flow at the forward end of the aircraft thus giving the aircraft a nose-up pitching moment. If now we consider a similar movement of the gas control ring with the gas being expelled from the peripheral nozzle 52, the two central vanes 64 will be elevated due to movement of the gas control ring 41 and will similarly produce a nose-up pitching moment on the aircraft. Similar remarks apply to the other vanes and movement of lateral series of vanes will have an effect in roll whereby the aircraft may be controlled in roll. By interconnecting the vanes 64 with the gas control ring 41, there is no discontinuity or hiatus in control of the aircraft during movement of the flaps 54 in transitions between hovering and forward flight.

During forward flight the rudder blades 74 are moved together to divert air rearwardly but are moved in opposition to one another to control the aircraft in yaw as has been previously described.

It will be seen that except for control in forward flight and the transition from hovering to forward flight, the aircraft is similar to that described in the afore-mentioned application Serial No. 108,365, and the response of the aircraft to control by the pilot or by automatic control in response to disturbance of the aircraft is identical to that described in the previous application to which reference should be made.

It will be understood that the form of the invention herewith shown and described is a preferred example and that various modifications may be carried out without departing from the spirit of the invention or the scope of the appended claims.

What I claim as my invention is:

1. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate the flow-proportioning means to variably apportion between the passages the flow of propulsive gas; and second actuating means to move the gas directing means to vary the position of the gas control surface relative to said mouth and thus to variably control the direction of flow of the propulsive gas expelled from the mouth.

2. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of said peripheral nozzle in positions to lie in the flow of gas expelled from the peripheral nozzle; first actuating means to operate the flow-proportioning means to variably apportion between the passages the flow of propulsive gas; second actuating means to move the gas directing means to vary the position of the gas control surface relative to said mouth and thus to variably control the direction of flow of the propulsive gas expelled from said mouth; and third actuating means for varying the orientations of the vanes relative to the structure.

3. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inborad boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of said peripheral nozzle in positions to lie in the flow of gas expelled from the peripheral nozzle; first actuating means to operate the flow-proportioning means to variably apportion between the passages the flow of propulsive gas; second actuating means to move the gas directing means to vary the position of the gas control surface relative to said mouth and thus to variably control the direction of flow of the propulsive gas expelled from said mouth; and interconnecting means between individual vanes and correlated portions of the gas directing means so that movement of the gas directing means causes changes in the orientations of the vanes.

4. An aircraft according to claim 3, wherein the vanes are pivotally mounted on the structure outboardly of said peripheral nozzle and about axes transverse to the gas flow through the peripheral nozzle.

5. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes pivotally mounted on the structure outboardly of said peripheral nozzle about axes transverse to the gas flow through the peripheral nozzle and in positions to lie in the flow of gas expelled from said nozzle; first actuating means to operate the flow-proportioning means to variably apportion between the passages the flow of propulsive gas; second actuating means to move the gas directing means to vary the position of the gas control surface relative to said mouth and thus to variably control the direction of flow of the propulsive gas expelled from said mouth; and interconnecting means between individual vanes and correlated portions of the gas directing means so that a change in position of the gas directing means causes corresponding changes in the orientations of the vanes such that with gas flowing through both said nozzles the corresponding movements of the gas directing means and the vanes each causes a force to be exerted on the aircraft in the same sense.

6. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; variable flow-proportioning means at the junction between the passages; gas directing means associated with the mouth of the annular nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate the flow-proportioning means to variably apportion between the passages the flow of propulsive gas; and second actuating means to move the gas directing means to vary the position of the gas control surface relative to said mouth thus to variably control the direction of flow of the propulsive gas expelled from the mouth.

7. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; a multiplicity of flaps arranged side by side at said junction and hinged to the structure, the flaps being movable between positions in which that part of the gas flow controlled by the flap may be directed entirely through a selected one of said nozzles; gas directing means associated with the mouth of annular nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate said flaps to variably apportion between the passages the flow of propulsive gas; and second actuating means to move the gas directing means to vary the position of the gas control surface relative to said mouth and thus variably to control the direction of flow of the propulsive gas expelled from the mouth.

8. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; a multiplicity of hinged flaps arranged in a plurality of arcuate series around the junction; means interconnecting each flap of a series with the other flaps of the same series, each series of flaps being movable between positions in which that part of the flow of propulsive gas controlled by the series may be directed entirely through a selected one of said nozzles; gas directing means associated with the mouth of the annular nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate the series of flaps independently of each other to variably apportion between the passages the flow of propulsive gas; and second actuating means to move the gas directing means to vary the position of the gas control surface relative to said mouth and thus variably to control the direction of flow of propulsive gas expelled from said mouth.

9. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportion determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of the central portion of said peripheral nozzle in positions to lie in the flow of gas expelled from said nozzle; cascade vanes positioned outboardly of the lateral portions of the peripheral nozzle to direct the propulsive gas expelled from said lateral portions rearwardly of the aircraft; first actuating means to operate the flow-proportioning means to variably apportion between the passages the flow of propulsive gas; second actuating means to move the gas directing means to vary the position of the gas control surface relative to said mouth and thus to variably control the direction of flow of the propulsive gas expelled from said mouth; and third actuating means for varying the orientations of the elevator vanes relative to the structure.

10. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; a multiplicity of flaps arranged side by side at said junction and hinged to the structure and movable between positions in which that part of the flow of propulsive gas controlled by the flap may be directed entirely through a selected one of said nozzles; gas directing means associated with the mouth of the annular nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate said flaps to variably apportion between the passages the flow of propulsive gas; second actuating means to move the gas directing means to vary the position of the gas control surface relative to said mouth and thus variably to control the direction of flow of the propulsive gas expelled from said mouth; movable elevator vanes carried by the structure outboardly of said peripheral nozzle and positioned to lie in the flow of gas expelled from said nozzle, the flaps being hinged about substantially horizontal axes; and third actuating means for varying the orientations of the elevator vanes relative to the structure.

11. An aircraft according to claim 10, wherein said third actuating means comprises means interconnecting the elevator vanes with said gas directing means whereby the orientations of individual vanes having peripheral positions adjacent to correlated points on the gas directing means are changed with changes of position of the gas directing means.

12. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; a multiplicity of hinged flaps arranged in a plurality of arcuate series around the junction; means interconnecting each flap of a series with the other flaps of the same series, the flaps of each series being movable between positions in which that part of the flow of gas controlled by the series may be directed entirely through a selected one of said nozzles; gas directing means associated with the mouth of the annular nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of said peripheral nozzle and positioned to lie in the flow of gas expelled from said nozzle, said vanes being hinged about substantially horizontal axes; interconnecting means between points on the gas directing means and individual elevator vanes having peripheral positions adjacent to said points so that changes in position of the gas directing means cause corresponding changes in the orientation of the vanes in such a manner that the force applied to the aircraft by a change in position of the gas directing means when gas is flowing through the annular nozzle is in the same sense as the force applied to the aircraft by the corresponding change in orientation of the vanes; first actuating means to operate each series of flaps independently of the other series to variably apportion between the passages the flow of propulsive gas; and second actuating means to move the gas directing means and, through the interconnecting means, the vanes to vary the positions of the gas control surface relative to said mouth and also to vary the positions of the vanes and thus variably to control the direction of flow of the propulsive gas expelled from each nozzle.

13. An aircraft according to claim 12, wherein the hinged elevator vanes are provided adjacent to the central portion of the peripheral nozzle and fixed cascade vanes are provided at the lateral portions of the peripheral nozzle to direct gas expelled from said lateral portions substantially rearwardly of the aircraft.

14. An aircraft according to claim 12, including two series of rudder blades arranged in the first gas displacement passage at positions forwardly of the forward ends of the junction between the two gas displacement passages and on opposite sides of the longitudinal axes of the aircraft; and means for operating the rudder blades to divert the gas passing through them thus to control the aircraft in yaw.

15. An aircraft having a body structure; walls within the structure forming first and second gas displacement passages; the first gas displacement passage terminating in a downwardly directed propulsive nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; first actuating means to operate the flow-proportioning means to variably apportion between the passages the flow of propulsive gas; a gyroscope rotor mounted in the structure to be capable of a limited degree of universal movement relative to the structure; biasing means interposed between the structure and the rotor to bias the latter to a neutral position within the structure; and second actuating means to move the gas directing means to vary the position of the gas control surface relative to said mouth and thus to variably control the direction of flow of the propulsive gas expelled from the mouth, said second actuating means operating in response to tilting of the rotor from its neutral position.

16. An aircraft according to claim 15 including pilot-operated means to tilt the rotor from its neutral position to actuate the gas directing means.

17. An aircraft according to claim 15 wherein the means to impel propulsive gas along the passages includes an impelling rotor which constitutes said gyroscope rotor.

18. An aircraft having a body structure; walls within the structure forming first and second gas displacement passages; the first gas displacement passage terminating in a downwardly directed propulsion nozzle having a mouth arranged to discharge at a multiplicity of positions distributed around a periphery on the underside of the aircraft and the second gas displacement passage leading off the first passage at a junction and terminating in a peripheral nozzle extending around a rear portion of the periphery of the structure; one of said walls forming the inboard boundary of said mouth and curving inboardly away therefrom in a smooth convex surface and another wall forming the outboard boundary of the mouth; variable flow-proportioning means at the junction between the passages; means within the structure to impel propulsive gas along said first passage to the junction and thence to the nozzles in the proportions determined by the position of the flow-proportioning means; gas directing means associated with the mouth of the downwardly directed nozzle; suspension means interposed between the gas directing means and the structure to movably suspend the gas directing means adjacent to the outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of said peripheral nozzle in positions to lie in the flow of gas expelled from the peripheral nozzle; first actuating means to operate the flow-proportioning means to variably apportion between the passages the flow of propulsive gas; a gyroscope rotor mounted in the structure to be capable of a limited degree of universal movement relative to the structure; biasing means interposed between the structure and the rotor to bias the latter to a neutral position within the structure; and second actuating means to move the gas directing means to vary the position of the gas control surface relative to said mouth and thus to variably control the direction of flow of the propulsive gas expelled from the mouth, said second actuating means operating in response to tilting of the rotor from its neutral position; and interconnecting means between individual vanes and correlated portions of the gas directing means so that movement of the gas directing means causes changes in the orientations of the vanes.

19. An aircraft according to claim 18 including pilot-operated means to tilt the rotor from its neutral position to actuate the gas directing means.

20. An aircraft according to claim 18 wherein the means to impel propulsive gas along the passages includes an impelling rotor which constitutes said gyroscope rotor.

21. An aircraft having a body structure; walls within the structure forming first and second gas displacement passages; means within the structure to impel gas outboardly along the passages; the first passage extending generally outboardly from the gas impelling means to an annular chamber and then downwardly to terminate in a downwardly directed annular nozzle having a mouth in the underside of the aircraft; one of said walls forming the inboard boundary of said mouth and curving inboardly away therefrom in a smooth convex surface and another wall forming the outboard boundary of the mouth; the second gas displacement passage leading off the first passage, at an arcuate junction lying in the annular chamber, and terminating in a peripheral nozzle extending around a rear portion of the periphery of the structure; a multiplicity of hinged flaps arranged in a plurality of arcuate series around the junction; means interconnecting each flap of a series with the other flaps of the same series, the flaps of each series being movable between positions in which that part of the flow of gas controlled by the series may be directed entirely through a selected one of said nozzles; gas directing means associated with the mouth of the annular nozzle; suspension means interposed between the gas directing means and the structure to movably suspend the gas directing means adjacent to outboard boundary of said mouth; said gas directing means having a gas control surface which forms a movable extension of said outboard boundary and which is shaped to direct gas expelled from the mouth inboardly around said convex surface; movable elevator vanes carried by the structure outboardly of said peripheral nozzle and positioned to lie in the flow of gas expelled from said nozzle, said vanes being provided adjacent to the central portion of the peripheral nozzle and hinged about substantially horizontal axes; fixed cascade vanes adjacent to the lateral portions of the peripheral nozzle to direct gas expelled from said lateral portions substantially rearwardly of the aircraft; interconnecting means between points on the gas directing means and individual elevator vanes having peripheral positions adjacent to said points so that changes in position of the gas directing means cause corresponding changes in the orientation of the vanes in such a manner that the force applied to the aircraft by a change in position of the gas directing means when gas is flowing through the annular nozzle is in the same sense as the force applied to the aircraft by the corresponding change in orientation of the vanes; first actuating means to operate each series of flaps independently of the other series to variably apportion between the passages the flow of propulsive gas; a gyroscope rotor mounted in the structure to be capable of a limited degree of universal movement relative to the structure; biasing means interposed between the structure and the rotor to bias the latter to a neutral position within the structure; and second actuating means to move the gas directing means and, through the interconnecting means, the elevator vanes to vary the positions of the gas control surface relative to said mouth and also to vary the positions of the elevator vanes and thus to variably control the direction of flow of the propulsive gas expelled from each nozzle, said second actuating means operating in response to tilting of the rotor from its neutral position.

22. An aircraft according to claim 21 including pilot-operated means to tilt the rotor from its neutral position to actuate the gas directing means.

23. An aircraft according to claim 21 wherein the means to impel propulsive gas along the passages includes an impelling rotor which constitutes said gyroscope rotor.

24. An aircraft according to claim 15 wherein the body structure is lentiform and is sheathed by opposed aerofoil surfaces which provide lift developing surfaces for the aircraft.

25. An aircraft according to claim 18 wherein the body structure is lentiform and is sheathed by opposed aerofoil surfaces which provide lift developing surfaces for the aircraft.

26. An aircraft according to claim 21 wherein the body structure is lentiform and is sheathed by opposed aerofoil surfaces which provide lift developing surfaces for the aircraft.

References Cited in the file of this patent

UNITED STATES PATENTS

| | | |
|---|---|---|
| 2,838,257 | Wibault | June 10, 1958 |
| 2,997,254 | Mulgrave | Aug. 22, 1961 |
| 3,045,951 | Freeland | July 24, 1962 |
| 3,067,967 | Barr | Dec. 11, 1962 |